2,882,255

POLYESTER COMPOSITION AND A VINYL COMPRISING PYRROLIDONE POLYMER AND METHOD OF PREPARING SAME

John R. Caldwell and Russell Gilkey, Kingsport, Tenn., assignors to Eastman Kodak Company, Rochester, N.Y., a corporation of New Jersey No Drawing. Application July 20, 1955
Serial No. 523,360

9 Claims. (Cl. 260—45.4)

This invention relates to synthetic resinous compositions comprising mixtures of a high melting, highly polymeric linear polyester and a highly polymeric ethenoid polymer derived from N-vinyl pyrrolidone. The invention also includes such mixtures in granulated form which can be melted and extruded to form fibers and films. Solutions of these resinous compositions can also be employed to spin fibers and cast film. The films and fibers produced possess greatly improved receptivity to cellulose acetate type dyes and acid wool dyes under ordinary dyeing conditions. Moreover, they have markedly reduced tendency toward static electrification.

A large number of synthetic linear condensation polymers are known to the art, and such polymers are ordinarily prepared by reacting a polybasic organic acid with a polyhydric alcohol, with or without the use of a condensation catalyst. The high molecular weight products which are thereby obtained are capable of being drawn into oriented fibers of the type described in U.S. Patent 2,071,250. The usual polyester fibers, such as those prepared from polyethylene terephthalate, are very difficult to dye, however, and special methods are usually employed in order to achieve any satisfactory degree of dyeing. Thus, at the present time, polyester fibers must be dyed at super atmospheric pressures with cellulose acetate dyes in order to obtain practical shades. This process requires the use of expensive equipment and is time consuming. An alternative process which has been used involved effecting the dyeing in the presence of a dye assistant or swelling agent such as phenol, cresol, benzoic acid, dichlorobenzene, or similar material. This process suffered the disadvantage, however, of often causing non-uniform swelling of the fiber with a resultant non-uniform application of the dye. Furthermore, most of the dyeing assistants were objectionable to use because of expense, toxicity, objectionable odor, or similar disadvantage.

It is accordingly an object of this invention to provide new modified linear polyesters from which fibers can be prepared which have improved dye affinity, especially for cellulose acetate type dyes and acid wool dyes.

Another object of the invention is to provide new and improved modified linear polyesters containing a polymer derived in whole or in part from N-vinyl pyrrolidone.

Another object of the invention is to provide new and improved modified polyesters suitable for the manufacture of fibers which can be dyes to practical shades under ordinary conditions with or without the use of super atmospheric pressures or dyeing assistants.

Another object of the invention is to provide a method for incorporating polymer derived in whole or in part from N-vinyl pyrrolidone into high molecular weight, fiber-forming polyesters.

Another object of the invention is to improve the dyeing properties of polyester fibers without susbtantially altering the melting point, tensile strength, elongation, or elastic recovery of the fibers.

Other objects will be apparent from the description and claims which follow.

These and other objects of the invention are accomplished by preparing a resinous composition comprising a mixture of (A) from about 95 to about 60 percent by weight of a high-melting, highly polymeric linear polyester of an aromatic dicarboxylic compound and a dihydroxy compound which is capable of being formed into oriented films and fibers, and (B) from about 5 to about 40 percent by weight of an ethenoid polymer derived from at least one ethenoid monomer comprised of from 40% to 100% by weight of N-vinyl pyrrolidone.

The preparation of the above-mentioned highly polymeric linear polyesters and the nature of the constituents employed for their preparation are generally well known in the art. The same applies to the above-mentioned highly polymeric ethenoid polymers derived from N-vinyl pyrrolidone. Although the polyesters and the ethenoid polymers are generally well known, it was quite unexpected to discover that these two classes of polymers are compatible enough to form mixtures which can be advantageously used for the production of fibers and films having the valuable and highly useful properties of linear polyesters together with markedly higher moisture absorption accompanied by decreased tendency toward static electrification and greatly improved dye receptivity. This is all the more surprising because the two classes of polymers mixed are so different in chemical structure that it would be expected that many important properties of the polyesters would suffer rather substantially. In contrast, it has been found that there is no substantial alteration of the melting point, tensile strength, elongation, elastic recovery, etc. Moreover, the desirable attribute of moisture absorption is increased by the remarkable factor of five or more. As a result, fibers and fabrics of these novel resinous compositions are of consequently greatly improved comfort when in contact with the skin. Fabrics of known polyesters suffer from their low capacity to absorb skin moisture which under some circumstances produces a feeling of clamminess, stickiness, and related unpleasant sensations.

Fibers prepared from the resinous compositions of this invention can be readily dyed with cellulose acetate type dyes and acid wool dyes. Moreover, these fibers also show some affinity for certain classes of direct cotton and vat dyes. It is therefore possible to dye fibers and fabrics of these resinous compositions to practical shades under ordinary dyeing conditions and without the use of superatmospheric pressures or dyeing assistants.

POLYESTER COMPONENT

The highly polymeric linear polyesters employed within the scope of this invention are those derived from aromatic dicarboxylic acids, esters or acid chlorides condensed with aliphatic or aromatic glycols, i.e. dihydroxy compounds containing two hydroxymethylene radicals or lower alkyl mono or diesters thereof.

The procedures for preparing such polyesters are now well known as exemplified by U.S. Patents 2,465,319, 2,614,120, etc. and copending applications filed on October 3, 1952, by J. R. Caldwell, now U.S. Patents 2,744,089–2,744,095.

The dicarboxylic compounds which can be advantageously employed include the following free acids, their alkyl esters or their acid chlorides:

Terephthalic acid
4,4'-sulfonyldibenzoic acid
1,2-di(p-carboxyphenoxy)-ethane
1,2-di(p-carboxyphenyl)-ethane
p,p-Diphenic acid

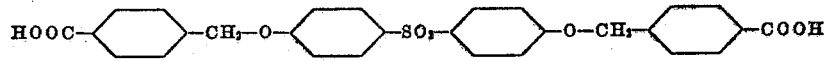

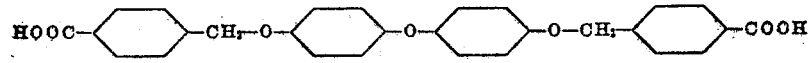

HOOC—C₂H₄—SO₂—C₂H₄—COOH
HOOC—(CH₂)₃—SO₂—(CH₂)₂
—SO₂—(CH₂)₃—COOH

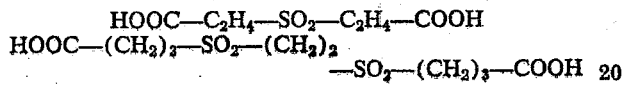

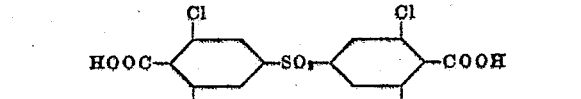

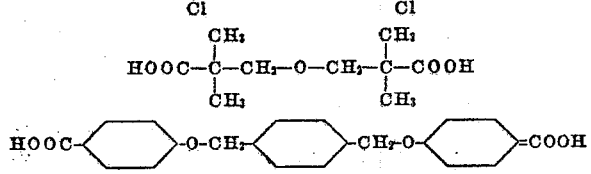

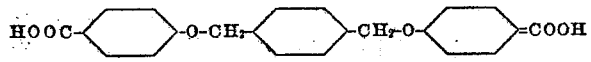

Tetrahydro-o-phthalic acid,
Carbic acid, i.e. 3,6-endomethylenecyclohexene-4,5-dicarboxylic acid, et cetera These aromatic dicarboxylic compounds can be employed in admixture with aliphatic dicarboxy compounds in many circumstances where a modification of the properties of the resultant polyester is desirable. The presence of aliphatic dicarboxy components may serve to reduce undesirably high melting points, give a broader softening temperature range, contribute greater elasticity, etc. Examples includes succinic acid, suberic acid, azelaic acid, dimethylmalonic acid, etc., as well as esters and acid chlorides thereof.

In addition to employing one of the aromatic dicarboxy compounds, mixtures of two or more can be employed with or without other dicarboxy compounds such as succinic acid, etc. Moreover, other related modifiers can be employed, e.g. a high-melting polyester can be prepared by condensing 4,4'-sulfonyldibenzoic acid or ester with a dihydroxy compound such as 1,5-pentanediol, in the presence of up to about 25 mole percent of a hydroxy aliphatic acid (based on the moles of the dicarbcarboxylic compound); this can be advantageously accomplished by using a lactone in the condensation reaction, particularly β-propiolactone which participates in the formation of interpolyesters which have good film-forming and fiber-forming properties.

The dihydroxy compounds or esters thereof which can be employed in the preparation of the polyesters include the polymethylene glycols containing from 2 to 12 carbon atoms, 2,2-dimethyl-1,3-propanediol, or mixtures of any of these glycols or mixtures thereof with other glycols including those below:

2-methylpentanediol,
2,2,3,3-tetrachlorobutane-1,4-diol,
3-methyl-hexanediol,

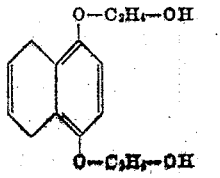

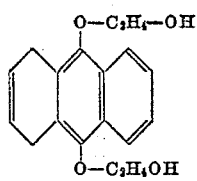

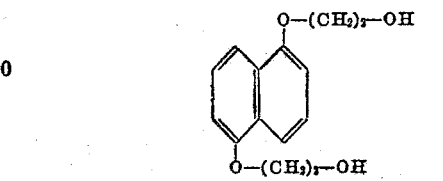

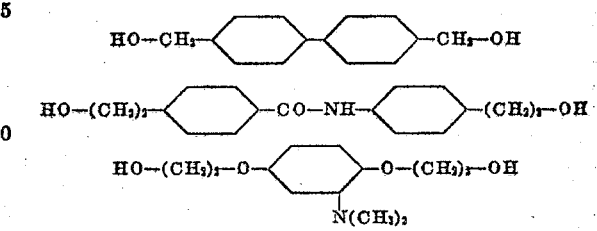

et cetera.

POLYVINYL PYRROLIDONE COMPONENT

The ethenoid polymers derived from at least one ethenoid monomer comprised of from 40% to 100% by weight of N-vinyl pyrrolidone are generally well known. These polymers can be prepared by procedures which have been clearly described in the literature and in prior patents, e.g. U.S. 2,335,454, U.S. 2,497,705, etc. The methods which can be employed include aqueous polymerization in solution or in suspension using hydrogen peroxide as a catalyst and a polymerization temperature of from about 40° to about 100° C. after which the polymer can be isolated by evaporating the water. Numerous other well known methods can be adapted to form these polymers.

A preferred method of forming these ethenoid polymers is to conduct the polymerization in a solvent which is advantageously an organic liquid compound, in particular esters, ketones and alcohols. It has been found that tertiary butyl alcohol is especially useful as a solvent. Other solvents which are well known include acetone, ethanol, methyl acetate, methyl ethyl ketone, isopropanol, etc. A solvent can be employed which is also a solvent for the polyester. The peroxide catalysts which can be employed are equally well known and include hydrogen peroxide, azo-bis-isobutyronitrile, benzoyl peroxide and many others. The azo type catalysts are especially effective, examples of which include α,α'-azo-bis-(α-γ-dimethylvaleronitrile), α,α'-azo-bis-(α-methylbutyronitrile), diethyl-α,α'-azodiisobutyrate, etc.

The copolymers of N-vinyl pyrrolidone within the scope of our invention are derived from mixtures of ethenoid monomers which are quite well known and include vinylic (CH₂=CH—) compounds, vinylidenic compounds (CH₂=C<) and 1,2-disubstituted ethylenic componds (—CH=CH—). Compounds of this type are illustrated by the group comprising a vinyl ester of a fatty acid containing from 2 to 6 carbon atoms, an isopropenyl ester of a fatty acid containing from 2 to 6 carbon atoms, an acrylic acid lower alkyl ester, a methacrylic acid lower alkyl ester, acrylic acid, methacrylic acid, itaconic acid, an itaconic acid lower alkyl ester, maleic acid, maleic acid esters, fumaric acid, fumaric acid esters, vinyl chloride, vinylidene chloride, styrene, α-methyl styrene, 2-vinylpyridine, 4-vinylpyridine, 2-methyl-5-vinylpyridine, acrylamide, an N-lower alkylacrylamide, an N,N-di-lower alkylacrylamide, methacrylamide, an N-lower alkylmethacrylamide, and N,N-di-lower alkylmethacrylamide, and tetramethylfumaramide. Other similar compounds can also be employed.

Particularly useful ethenoid polymers are those terpolymers consisting of from about 70% to about 40% by weight of N-vinyl pyrrolidone, from about 20% to about 50% by weight of an unsaturated amide (as illustrated in the preceding paragraph), and from about 10 to about 30% of a vinylpyridine compound (similarly illustrated). These terpolymers contribute to the synthetic resinous composition an especially strong affinity for a wide variety of dyes and are relatively superior in contributing toward low static electrification, high moisture absorption, etc.

MIXED RESINOUS COMPOSITIONS

The resinous compositions of this invention contain from about 60% to 95% by weight of the polyester and from about 40% to 5% by weight of the ethenoid polymer. Most advantageously these mixtures contain from about 75% to about 85% of the polyester. These resinous compositions can be prepared by mechanically blending the polyester and the ethenoid polymer in their solid form either hot or cold, by mixing them in their molten form, by mixing a solution of each in some suitable common solvent, or by an other convenient method. Suitable solvents which can be advantageously employed include γ-valerolactone, γ-butyrolactone, dimethylsulfolane, dimethylacetamide, trichloroethane, tetrachlorethane, etc. When solutions have been thoroughly mixed, the solvent is evaporated to leave the desired resinous composition; the solutions can be used advantageously in the spinning of fibers or formation of films by the customary techniques. One variation of the various methods of mixing polyesters and ethenoid polymers consists in incorporating particles of the ethenoid polymer into the reaction mixture during the condensation reaction forming the polyester. Another variation of particular value consists of spraying a solution of the ethenoid polymer onto the polyester which is in a granulated or powdered form; the solvent is then evaporated from the wet granular mixture leaving a dry mixture of polyester particles coated or impregnated with the ethenoid polymer. This latter method is especially advantageous in handling resinous compositions which are to be extruded to form fibers, films and the like. It is particularly useful when the polyester to be admixed with the ethenoid polymer is already in particle form. The amount of solution of ethenoid polymer and the concentration of this solution can be very easily adjusted so as to result in the formation of particles of a resinous composition containing from 5% to 40% by weight of the ethenoid polymer after the solvent has been evaporated. Any of the volatile solvents mentioned above can be employed.

The following examples will serve to further illustrate our invention:

Example 1

Fifty g. vinyl pyrrolidone and 50 g. N-isopropylacrylamide were dissolved in 100 g. of ter-butyl alcohol and 1.0 g. of azo-bis-isobutyronitrile was added as catalyst. The solution was heated at 70–80° C. for 6 hours and 0.3 g. more catalyst was added. Heating was continued for 6 hours to give a clear, viscous solution that contained approximately 50% vinyl pyrrolidone–50% N-isopropylacrylamide copolymer by weight. A polyester having the composition 1.0 mole 4,4'-sulfonyldibenzoic acid+1.0 mole azelaic acid+2.0 moles pentanediol (U.S. Patent 2,744,091) was prepared. One hundred g. of the polyester was dissolved in 800 cc. of tetrachloroethane and 40 g. of the ter-butyl alcohol solution of the vinyl pyrrolidone copolymer was added (20 g. of copolymer). Films were cast from the solution. The films were flexible and strong. They dyed heavily with acid wool dyes. The films had a moisture regain of 4.1% at 65% R.H.

Films of the same polyester containing no vinyl pyrrolidone copolymer did not dye with wool dyes and had a moisture regain of only 0.4%.

Example 2

One hundred g. vinyl pyrrolidone was dissolved in 150 g. ter-butyl alcohol and 0.4 g. hydrogen peroxide was added. The solution was heated at 70–80° C. for 6 hours and 0.3 g. more hydrogen peroxide was added. The solution was heated for 10 hours longer to give a clear, viscous solution of polyvinyl pyrrolidone. The solution was diluted with 300 g. of ter-butyl alcohol and sprayed onto a pulverized polyester having the composition: 0.8 mole 4,4'-sulfonyldibenzoic acid+0.2 mole terephthalic acid+1.0 mole pentamethylene glycol (2,744,094). The amount of solution used was adjusted to give 20 parts polyvinyl pyrrolidone for 100 parts of polyester. The solvent was evaporated in vacuum at 100° C. This coated polyester resinous composition was extruded through a multihole spinnerette to give fibers. After drafting and heat setting, the fibers had a strength of 2.8 grams per denier and an elongation of 56%. They dyed well with cellulose acetate dyes, acid wool dyes, and some direct cotton dyes. They had a moisture regain of 3.8% at 65% relative humidity.

The same polyester, without the vinyl pyrrolidone polymer, gave fibers that had a moisture regain of only 0.4%. They could not be dyed with acid wool dyes.

Example 3

Forty-five g. vinyl pyrrolidone, 40 g. N-isopropylacrylamide, and 15 g. 2-methyl-5-vinyl pyridine were dissolved in 200 cc. ter-butyl alcohol and 0.8 g. azo-bis-isobutyronitrile was added as catalyst. The solution was heated at 70–80° C. for 3 hours and 0.4 g. more catalyst was added. Heating was continued for 6 hours to give a clear, viscous solution. The solution was diluted with 200 cc. of methyl alcohol and sprayed onto a granulated polyester made from 4,4'-sulfonyldibenzoic acid and hexamethylene glycol (U.S. Patent 2,744,089). Fifteen parts of the vinyl pyrrolidone polymer was used per 100 parts of polyester. The coated polyester resinous composition was extruded to give strong, elastic fibers that had a sticking temperature of 215–225° C. The fibers dyed well with cellulose acetate dyes, acid wool dyes, and some direct cotton dyes. The moisture regain was 3.5% at 65% relative humidity.

This polyester fiber, without the vinyl pyrrolidone polymer, has a moisture regain of 0.3% and could not be dyed with any of the dyes listed above.

Example 4

Using the method described in Example 3, a polymer was made from 40% vinyl pyrrolidone, 40% N-methylmethacrylamide, and 20% 4-vinyl pyridine. One hundred parts polyethylene terephthalate was melted in a nitrogen atmosphere and 20 parts of the vinyl pyrrolidone polymer was added. The melt was stirred for 5 minutes to form an intimate mixture and was then extruded to give strong, elastic fibers. The fibers dyed heavily at the boil with cellulose acetate dyes, acid wool dyes, direct cotton dyes, and some vat dyes. The moisture regain was 4.6% at 65% relative humidity.

Polyethylene terephthalate fibers that contain no vinyl pyrrolidone polymer cannot be dyed with acid wool, direct cotton, or vat dyes. They can be dyed with cellulose acetate dyes only when superatmospheric pressure is used or with swelling agents in the dye bath.

Example 5

Using the method described in Example 3, a polymer was made from 60% vinyl pyrrolidone, 25% N-ethylacrylamide, and 15% 2-methyl-5-vinyl pyridine. Twenty-five parts of the vinyl pyrrolidone copolymer was sprayed on 100 parts of a polyester made from 4,4'-diphenic acid and tetramethylene glycol. Fibers were spun from the mixture. They dyed well with cellulose acetate dyes, acid wool dyes, direct cotton dyes, and some vat dyes. The moisture regain of the fibers was 4.2% at 65% relative humidity.

Example 6

A polymer was made from 70% vinyl pyrrolidone and 30% ethyl acrylate. Thirty parts of the copolymer was mixed with 100 parts of melted polyester having the composition 1,2-di(p-carboxyphenoxy)ethane + ethylene glycol. The melt was extruded to give fibers that dyed well with cellulose acetate dyes and acid wool dyes. The moisture regain was 4.8%.

Example 7

Fifteen parts of the vinyl pyrrolidone copolymer described in Example 5 was sprayed on 100 parts of a powdered polyester made from 1,2-di(p-carboxyphenylethane) + ethylene glycol. The fibers dyed well with cellulose acetate dyes, acid wool dyes, and direct cotton dyes.

Example 8

A polymer was made from 75% vinyl pyrrolidone and 25% maleic anhydride. Eighteen parts of the polymer was sprayed on 100 parts of a polyester made from 4,4'-sulfonyldibenzoic acid and pentamethylene glycol. Fibers spun from the mixture dyed well with cellulose acetate dyes, direct cotton dyes, acid wool dyes, vat dyes, and basic dyes. The moisture regain was 3.4%.

It is clearly apparent from these examples that any of the polyesters described hereinabove can be advantageously mixed with any of the similarly described ethenoid polymers to form useful resinous compositions coming within the scope of this invention and having analogous valuable properties.

We claim:

1. A resinous composition comprising a mixture of (A) from about 95 to about 60 percent by weight of a high melting, highly polymeric linear polyester of at least one dicarboxylic acid which consists of a major proportion selected from the group consisting of terephthalic acid, 4,4'-sulfonyldibenzoic acid, 4,4'-diphenic acid, 1,2-di(p-carboxyphenoxy)ethane and 1,2-di(p-carboxyphenyl)ethane and a glycol containing from 2 to 10 carbon atoms, which polyester is capable of being formed into oriented films and fibers, and (B) from about 5% to about 40% by weight of an ethenoid polymer of N-vinylpyrrolidone containing at least 40% by weight of N-vinylpyrrolidone, which resinous composition is capable of being formed into oriented fibers having a minimum moisture regain at 65% relative humidity of about 3.5%.

2. A resinous composition as defined in claim 1 comprising a mixture of (A) from about 95 to about 60 percent by weight of a polyester of major amount of 4,4'-sulfonyldibenzoic acid, a minor amount of an aliphatic dicarboxylic acid containing from 4 to 20 carbon atoms and a glycol containing from 2 to 10 carbon atoms, and (B) from about 5 to about 40 percent by weight of a copolymer of about 50% by weight vinyl pyrrolidone and about 50% N-isopropylacrylamide.

3. A resinous composition as defined in claim 1 comprising a mixture of (A) from about 95 to about 60% by weight of a polyester of terephthalic acid and a glycol containing from 2 to 10 carbon atoms, and (B) from about 5 to about 40% by weight of a polymer of vinyl pyrrolidone.

4. A resinous composition as defined in claim 1 comprising a mixture of (A) from about 95 to about 60% by weight of a polyester of 4,4'-sulfonyldibenzoic acid and a glycol containing from 2 to 10 carbon atoms, and (B) from about 5 to about 40% by weight of a polymer of vinyl pyrrolidone.

5. A resinous composition as defined in claim 1 comprising a mixture of (A) from about 95 to about 60% by weight of a polyester of 4,4'-sulfonyldibenzoic acid and a glycol containing from 2 to 10 carbon atoms, and (B) from about 5 to about 40% by weight of a terpolymer of 45% vinyl pyrrolidone, 40% N-isopropylacrylamide and 15% 2-methyl-5-vinylpyridine.

6. A resinous composition as defined in claim 1 comprising a mixture of (A) from about 95 to about 60% by weight of a polyester of terephthalic acid and ethylene glycol, and (B) from about 5 to about 40% by weight of a terpolymer of 40% vinyl pyrrolidone, 40% N-methylmethacrylamide and 20% 4-vinylpyridine.

7. A resinous composition as defined in claim 1 comprising a mixture of (A) about 80% by weight of a polyester of 4,4'-diphenic acid and tetramethylene glycol, and (B) about 20% by weight of a terpolymer of about 60% vinyl pyrrolidone, about 25% N-ethacrylamide and about 15% 2-methyl-5-vinylpyridine.

8. An oriented fiber drawn from a resinous composition as defined in claim 1.

9. A method of preparing a resinous composition as defined in claim 1 which is in granular form suitable for use in extrusion apparatus for making fibers, which comprises granulating the linear polyester to form a free-flowing powdered polyester, forming a solution of the ethenoid polymer in a solvent therefor which is a liquid organic compound selected from the group consisting of alcohols, esters and ketones, spraying the solution on the powdered polyester, and evaporating the solvent, the amount of solution sprayed being sufficient to produce a resinous composition containing from 5 to 40% by weight of the ethenoid polymer when the solvent has been evaporated.

References Cited in the file of this patent

UNITED STATES PATENTS

| | | |
|---|---|---|
| 2,551,731 | Napier et al. | May 8, 1951 |
| 2,643,990 | Ham | June 30, 1953 |

FOREIGN PATENTS

| | | |
|---|---|---|
| 610,140 | Great Britain | Oct. 12, 1948 |